United States Patent [19]

Armstrong

[11] Patent Number: 4,748,512
[45] Date of Patent: May 31, 1988

[54] DATA COMPACTION PROCESS FOR DIGITIZED IMAGES

[75] Inventor: Glynn E. Armstrong, Watauga, Tex.

[73] Assignee: National Business Systems, Inc., Moonachie, N.J.

[21] Appl. No.: 899,639

[22] Filed: Aug. 25, 1986

[51] Int. Cl.$^4$ ............................................. H04N 1/419
[52] U.S. Cl. ..................................................... 358/261
[58] Field of Search ............................. 358/260, 261; 340/347 DD

[56] References Cited

U.S. PATENT DOCUMENTS

| | | | |
|---|---|---|---|
| 4,542,413 | 9/1985 | Rallapalli | 358/261 |
| 4,630,124 | 12/1986 | Emdoh | 358/260 |
| 4,682,215 | 7/1987 | Adachi | 358/261 |

*Primary Examiner*—Edward L. Coles, Sr.

*Attorney, Agent, or Firm*—Antonelli, Terry & Wands

[57] ABSTRACT

An improved data compaction process for encoding digitized images is disclosed. The process uses four fields of data with field one encoding the number of lines having an identical format, field two encoding the number of bytes having bits of one pre-designated single binary value up to the maximum number which can be defined with the field, field three containing the byte of image points immediately following the last byte encoded by the preceding field, and field four encoding the number of sequential bytes having bits of only the binary value of the last bit of the preceding field of data, up to the maximum number which can be defined with the field. Fields three and four are repeated to encode all points along a line of the digital image. The above process is repeated for each line of the digital image until the entire image has been encoded.

9 Claims, 12 Drawing Sheets

FIG. 3.

| 22 | 24 | 26 | 28 |
|---|---|---|---|
| ENCODED NUMBER OF IDENTICAL LINES 8 BITS 1-255 LINES | ENCODED NUMBER OF BYTES OF IMAGE POINTS WHICH ARE ALL 0's (LIGHT AREA) 8 BITS | BYTE CONTAINING THE ACTUAL BIT PATTERN OF THESE IMAGE POINTS FOLLOWING THE IMAGE POINTS ENCODED BY PRECEDING FIELD (24 OR 28) | ENCODED NUMBER OF SEQUENTIAL BYTES HAVING ALL BITS OF THE BINARY VALUE OF THE LAST BIT OF THE PRECEDING BYTE. (PART 26) |

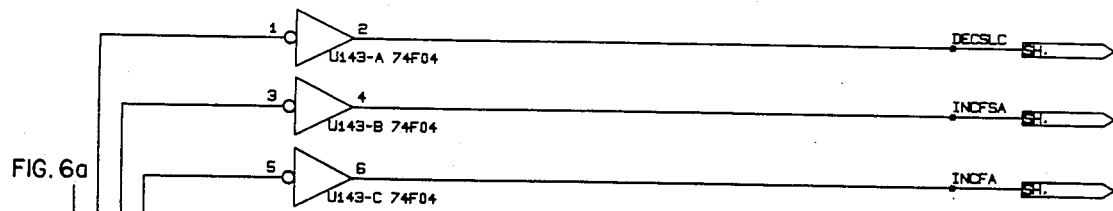
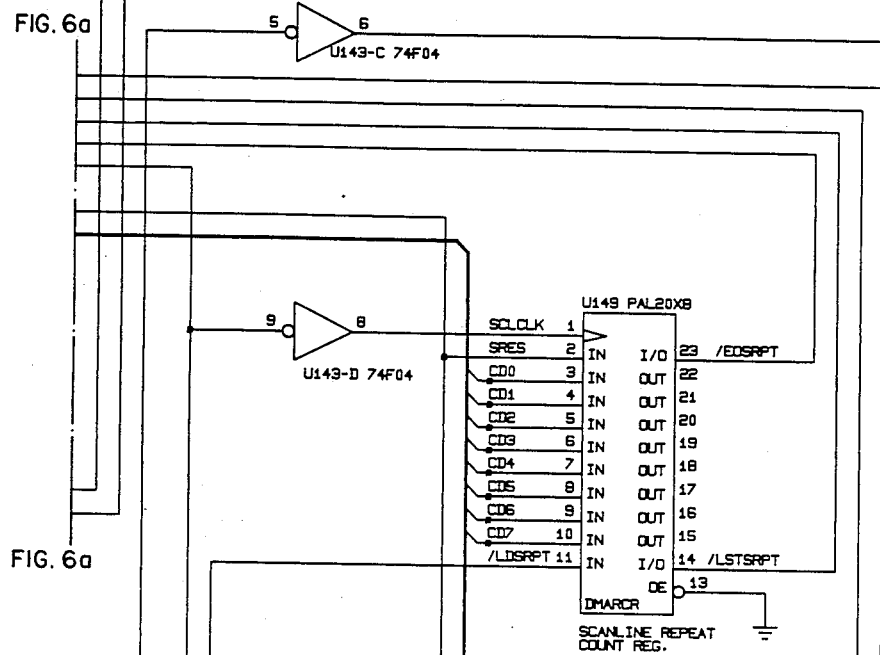
FIG. 6d.
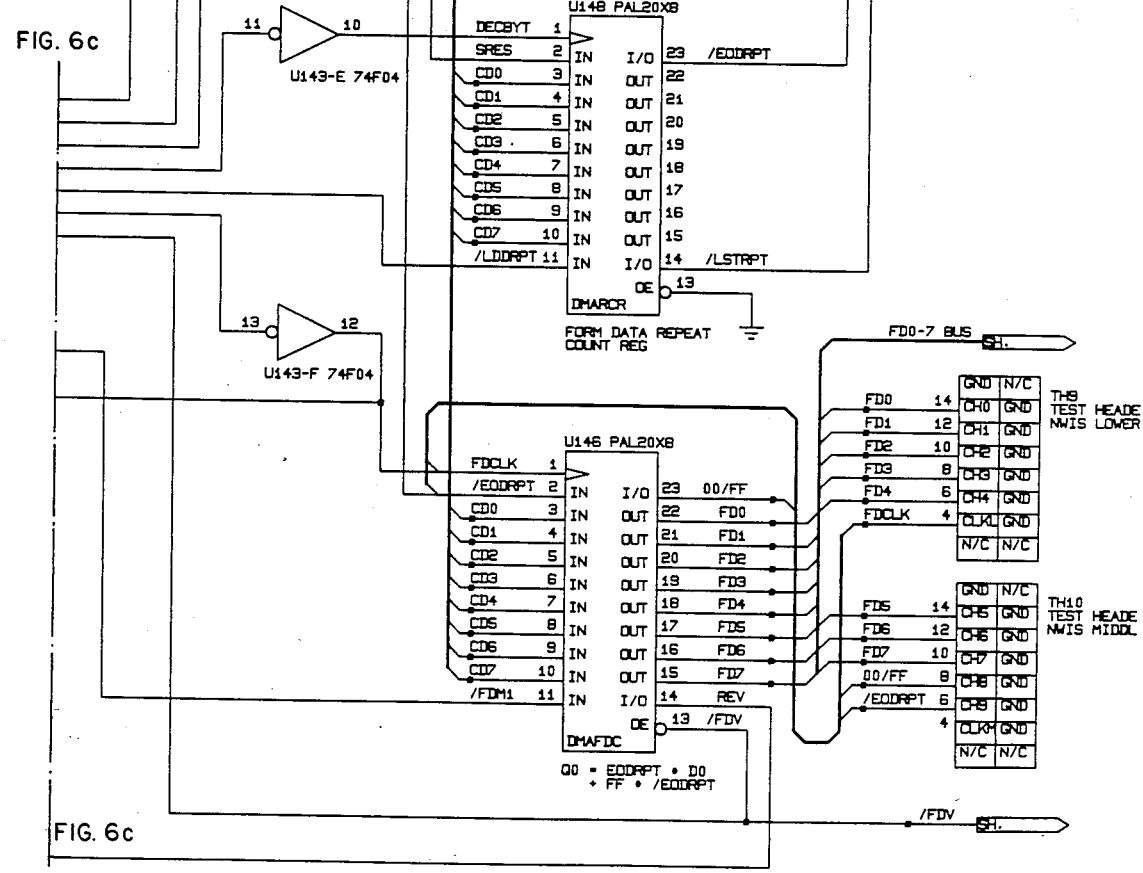

DATA COMPACTION PROCESS FOR DIGITIZED IMAGES

BACKGROUND OF THE INVENTION

1. Field of the Invention

The present invention relates to a process for encoding digitized images to reduce storage requirements to completely store the digitized image. A digitized image is formed by sampling a plurality of points in an analog image and storing the value of each point as a binary one or a zero.

2. Description of the Prior Art

The assignee of the present invention has marketed a high speed printer under the trademarks ANSER I and VISION which prints documents such as, but not limited to, business forms from stored digitized images. These printers have a print engine manufactured under one or more of U.S. Pat. Nos. 4,155,093, 4,160,257, 4,267,556, 4,365,549 and 4,379,969. The print engine has a dot matrix array in which individual points are selectively printed with a dark dot by the simultaneous application of a high frequency potential between a selector bar and ground and a direct current potential between a finger electrode and a dielectric receptor counterelectrode as described in U.S. Pat. No. 4,155,093. A drum is charged with the image which is toned and transferred to the sheet to be printed. The toner is cold fused.

The aforementioned ANSER I and VISION systems drive the dot matrix from a digitized image which is stored in memory without data compaction of the number of individual points of the digitized image by an encoding technique.

The assignee experimented with a form of run length encoding for compressing a digitized image of typical business forms in the VISION system. While this process produced an acceptable degree of data compression in the storage of the digitized image, the process was complicated to implement in hardware because of the necessity of rotation and shifting cycles to process the individual bits. High speed processing of digital images is required for high speed printers such as the ANSER I and VISION systems to achieve high printing throughputs. For printing a repertoire of forms which each have recurring information of a fixed format, a technique is needed to reduce the memory requirements for storage of the fixed format component to permit multiple formats to be stored efficiently in memory of the printing systems which may be read out without taking too many bus cycles and requiring continued access to the working memory for read out which interferes with the controller's access to the memory to execute other functions.

The high resolution of the print engine in the VISION of 240 pixels per inch necessitates the use of considerable memory to store even the simplest of forms. The storing of a number of digitized forms each as a full bit map which could be selectively called would consume a considerable amount of the working space in a disk unit of the VISION control system possibly preventing the storage of other information and interfering with communications of the disk unit with other parts of the system. Moreover, transmitting large amounts of data from a disk unit to the print engine can be time consuming which would influence throughput.

The known data compaction technique of run length encoding encodes a string of identical bits by the coding of the length of the string of identical bits. Run length encoding can achieve high degrees of compaction. Run length encoders may process the bits in serial or parallel form.

U.S. Pat. No. 4,327,379 discloses an encoding technique for a digitized image which encodes the number of all multibit nibbles storing all zeros in a field followed by the actual bits of a terminating nibble having at least one bit storing a one value. This technique does not encode the number of nibbles having only the level of last bit of the nibble storing at least one bit having a one level which sequentially follow the nibble storing at least one bit as one.

SUMMARY OF THE INVENTION

The present invention is an improved process for encoding digitized images which is useful for achieving a high degree of data compaction. The invention is especially useful for storing digitized images of forms of business documents to be printed by a high speed printer which may be selectively called from storage in memory and decompressed at high speed in hardware to drive a print engine.

The invention has the advantage of providing a high degree of data compaction in the encoding of a digitized image which is compatible with a hardware based decompaction unit for driving a print engine. With a hardware based decompaction unit the stored compacted digitized image produced by the process of the present invention may be transmitted to RAM located at the hardware based decompaction unit with a small number of disk unit cycles which frees the disk unit to be used for other purposes by the system controller.

A process for encoding a digitized image comprised of one or more lines with each line of the image having a plurality of groups of sequential digitized points extending from a first point to a last point wherein the individual points are encoded as binary levels of 1 or 0 in accordance with the invention comprises encoding each line of the digitized image with an integer number of fields of bits. There are four types of fields of bits comprising a first type encoding a number of sequential groups of points, with each group being encoded with bits of only one pre-designated binary level, extending from a starting point of the line to a group of points which either immediately precedes a group of points which has one or more points encoded with a bit of the other binary level or to a group of points which is one more than the maximum number of groups which can be defined with the first type of field, a second type containing the actual bits of the group of image points following the image points encoded by the preceding field; and a third type encoding a number of groups of points encoded with bits which contain only the level of the last bit of the second type of field which immediately follow the last bit of the image points encoded by the second type of field; and encoding any remainder of the line not encoded by the first, second and third type of fields by repeating the encoding process of the second type and the third type set forth above with respect to the remainder of the line until the group of points containing the last point is encoded. Furthermore, in accordance with the invention, a fourth type of field encodes the number of consecutive lines within the digitized image which have the same identical format encoded by the first, second and third field types.

Preferably, each of the groups of bits and each of the fields is eight bits to take advantage of the byte oriented processing of a microprocessor architecture implementing the program.

Typically, the pre-designated binary level of the bits encoded with the first field type is for light areas of an image when the invention is used to encode forms to be printed in business documents.

Multiple formats may be compactly stored in a system memory with the present invention which may be selectively called to print a plurality of desired forms. Variable data, such as text, may be added to the data defining the form at the time that the digitized image of each of points is created by the expanding of the encoded image into the digitized image.

BRIEF DESCRIPTION OF THE DRAWINGS

FIG. 3 illustrates the sequence of fields used by the invention to encode a portion of a line of a digitized image with the invention.

FIGS. 6a-d illustrate a circuit diagram of a controller of a form decompressor which is part of a decompression unit to be used in decompressing a stored compressed digital image encoded with the present invention.

DESCRIPTION OF THE PREFERRED EMBODIMENT

The present invention is an improved process for encoding a digitized image which may be used to encode digitized images of diverse formats. Preferably, the invention is used in the printing of forms or printing of documents in high quantities at high speed. With the invention, a plurality of encoded digitized images may be stored with a high level of data compaction on a disk for recall by a high speed printer which prints numerous documents including the image represented by the encoded digitized image. The high degree of data compaction minimizes the number of disk cycles which are required to transmit the forms to a hardware based decompaction unit. Preferably, the process of the present invention is implemented in a programmed microprocessor which processes each of the desired digitized images which may be provided by a data base defining each of the digitized images as the individual digitized points within the image, a series of graphics commands, or other known methods for specifying digital images. Reproduced below is a source code listing of a suitable program for performing the process of the present invention on a Model MC68000 microprocessor manufactured by Motorola Corp. which is the system controller for a high speed printing system in the VISION system. It should be understood that the present invention may be implemented in both hardware or software in either a general purpose programmable processor or in a special purpose processor.

Figure 1:
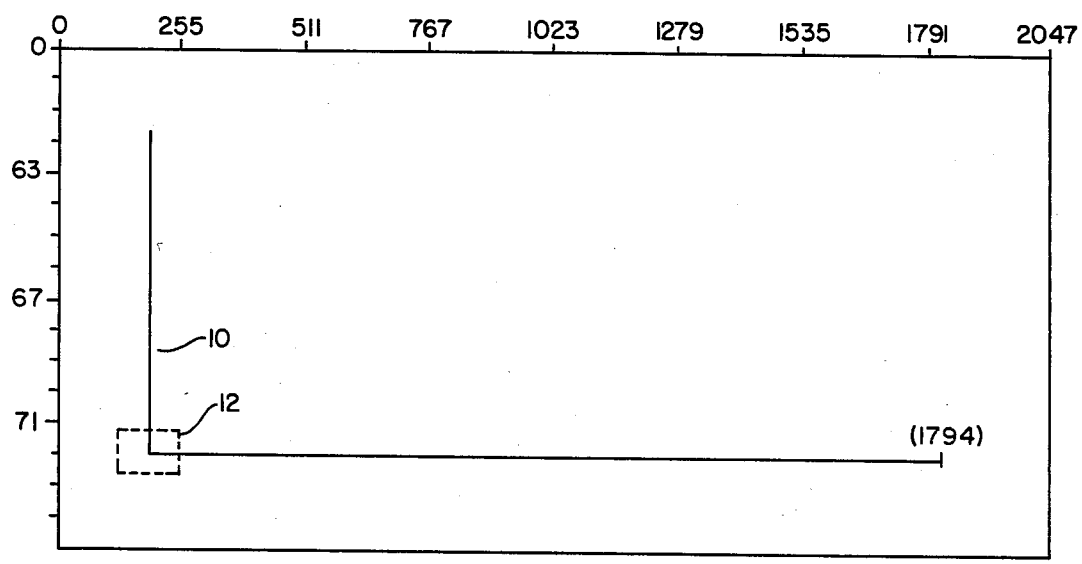
FIG. 1 illustrates an example of an image to be compacted by the encoding process of the present invention.

FIG. 1 illustrates an example of an image which may be digitized into a matrix of points which are stored as a binary one or zero. The X-Y coordinates correspond to the coordinates of the dot matrix of a print engine like that used in the aforementioned VISION system. The print engine is manufactured under one or more of U.S. Pat. Nos. 4,155,093, 4,160,257, 4,267,556, 4,365,549 and 4,379,969. The print engine includes a matrix dot printer having a total of 2,048 pixels per line with 240 pixels per inch and individual lines spaced apart by 240 per inch. However, it should be understood that the invention is not limited to any particular system application such as a high speed printer. The matrix printer may have any number lines per inch and dots per line. The process of forming an image by selectively printing individual dots within a matrix is described in detail in the aforesaid patents and is not described herein. The print engine selectively activates each of the 2,048 dots per line of printing with subsequent lines being activated at the rate at which paper is fed through the printer.

To illustrate an example of the process of the invention for encoding a digitized image with the present invention, FIG. 1 illustrates a form 10 having an intersecting horizontal and vertical line which is the image to be reproduced in detail by the print engine as part of a repeating form. While the image 10 is simple in nature, it provides an illustration of the encoding technique of the present invention which is described in detail in FIG. 2 below regarding area 12. It should be understood that the numerical values on the abscissa and ordinate correspond to the point addresses of the image 10 to be printed by the dot matrix of the print engine.

Figure 2:
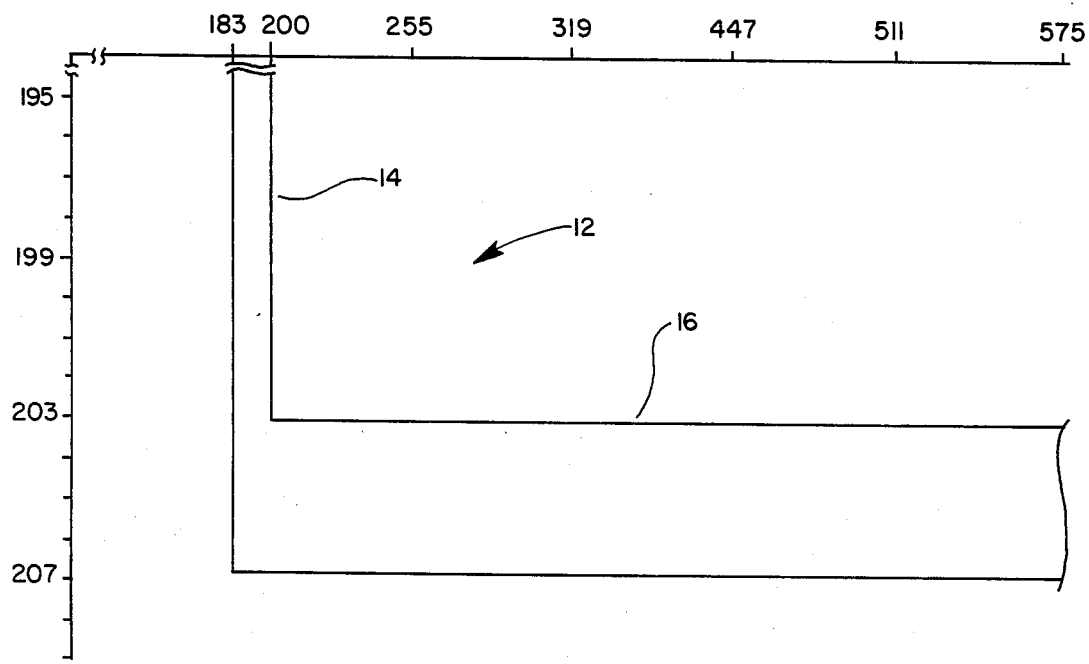
FIG. 2 illustrates an expanded portion of the image of FIG. 1 illustrating the compaction process of the present invention.

FIG. 2 illustrates the expanded portion 12 of FIG. 1 in detail to illustrate the precise encoding technique of the present invention. The expanded portion 12 consists of a vertical portion 14 which has a line structure which is 16 pixels wide spanning pixel addresses 183-200. The printing of portion 14 is produced by the activation of the dots bearing X axis addresses 183-200 in the print engine for each of the vertically separated line arrays in the print engine between Y axis addresses 47 and 202. The image 12 also has a horizontally extending section 16 having an X axis addresses 183-1794 and Y axis addresses 203-207. As has been stated above, it should be understood that image section 12 illustrated in FIG. 2 is representative of only a portion of the image illustrated above in FIG. 1.

The encoding process of the present invention uses three types of data fields to encode segments of each line of a digital image with a fourth type of data field for encoding the number of identical lines which contain the same format which may vary from one to any specified number of lines depending upon the bits allotted for each of the fields.

Typical business forms may extend over one or more pages. Therefore, depending upon the circumstances of the length of the form, it may be necessary to allocate a larger number of bits to the fourth type of data field to encode the number of lines which are repeating with the same format.

FIG. 3 illustrates the preferred format of the sequence of fields 20 of the process of the present invention for encoding a single segment of a digitally encoded line of an image which is repeated for multiple lines. Each line is encoded using four types of fields 22, 24, 26 and 28. The field type 22 is the encoded number of consecutive identical lines having the same format. Thus, if there are no identical repeat lines, the field 22 will be encoded with 8 bits with a binary value of 1. A total of anywhere from 1 to 255 repeating lines may be encoded with the 8 bits in field type 22. Field type 24 is the encoded number of bytes (8 bits) of image points beginning with the starting point of a line which are encoded with all zeros which correspond in the preferred embodiment to a light area on which the dot matrix of the print engine is to not print anything. A total of anywhere from 0 to 255 whole bytes of image points with the pre-designated binary level may be encoded with the 8 bits in field type 24. Thus, if there are no whole bytes of image points with bits of only one binary level, the field 24 will be encoded with a binary value of 0. Field type 26 is a byte which contains the actual bit pattern of the 8 image points which immediately follow the last byte containing all zeros as specified in field 24. The location of the information contained within the field 26 of the byte stored therein is determined with respect to the beginning of the line by the specification of the number of encoded bytes of all zeros as described in conjunction with field 24 above. Field 28 is the encoded number of sequential bytes of points having all bits encoded with the binary value of the last bit of field 26. In the preferred embodiment, fields 24 and 26, are always present at least once because of the length of the line being 256 bytes of points which is one more than can be encoded within an 8 bit field for the encoding of all of the points along a single line and under normal circumstances field 26 will be followed by field 28, then 26, then 28, etc., which will be repeated a plurality of times because of detail along the line until the entire line is encoded.

Figure 4A:
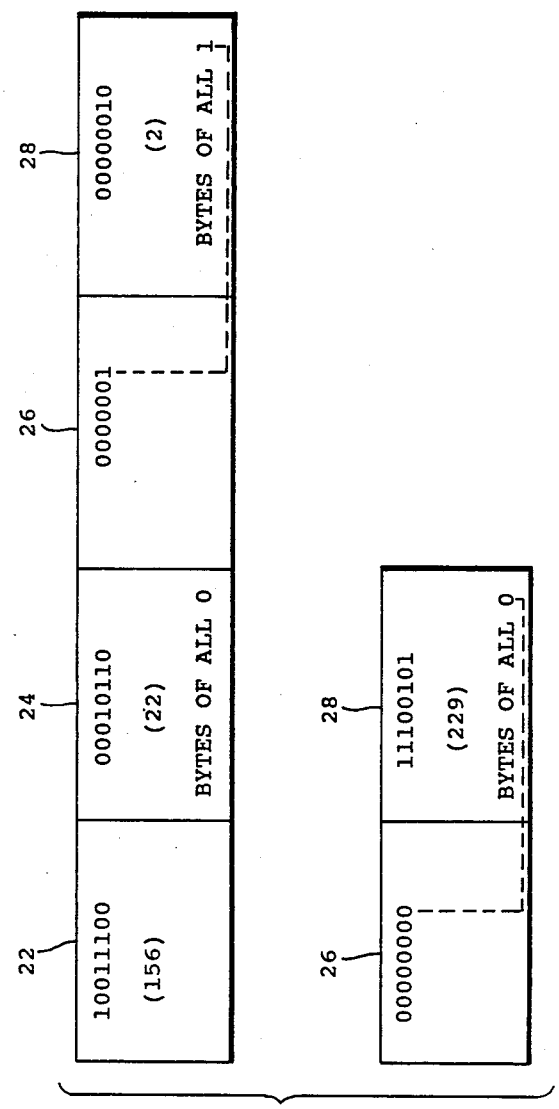
FIG. 4a illustrates the encoding process of the invention for a portion of the lines of FIG. 2.

The following examples with reference to FIGS. 4a and b are given to illustrate the encoding technique with the fields described above with reference to FIG. 2 for encoding all of the lines with Y axis addresses from 47 down through 207.

FIG. 4a illustrates the encoding technique in accordance with the invention for lines having Y axis addresses from 47 to 202 which correspond to vertical segment 14 of image 12. Field 22 identifies the number of identical lines which is 156 given the fact that the first line of scanning is the 47th line and the last line of scanning is the 202nd line as illustrated in FIG. 2. Field 24 encodes the number of bytes of zeros which extend from the horizontal axis origin to the last byte containing all zeros before point 183. This number is equal to 22 bytes which extends to point 176. Field 26 encodes the next byte, the last bit of which is equal to one. Field 28 encodes the number of bytes which have only bit values equal to the last bit of part 26. This value is equal to two for the reason that the vertical portion of the line segment 14 extends from points 183 to point 200. In accordance with the present invention, the fields 26 and 28 are repeated in sequence a number of times which is necessary to completely encode the line points contained in the line of scan through the last point 2047. Therefore, field 26 encodes the next byte which is equal to 0. Points 209–2047 span a total of 229 bytes of points encoded with all zeros. The inclusion of field 28 with a value of 229 completely encodes the line of scanning.

Figure 4B:
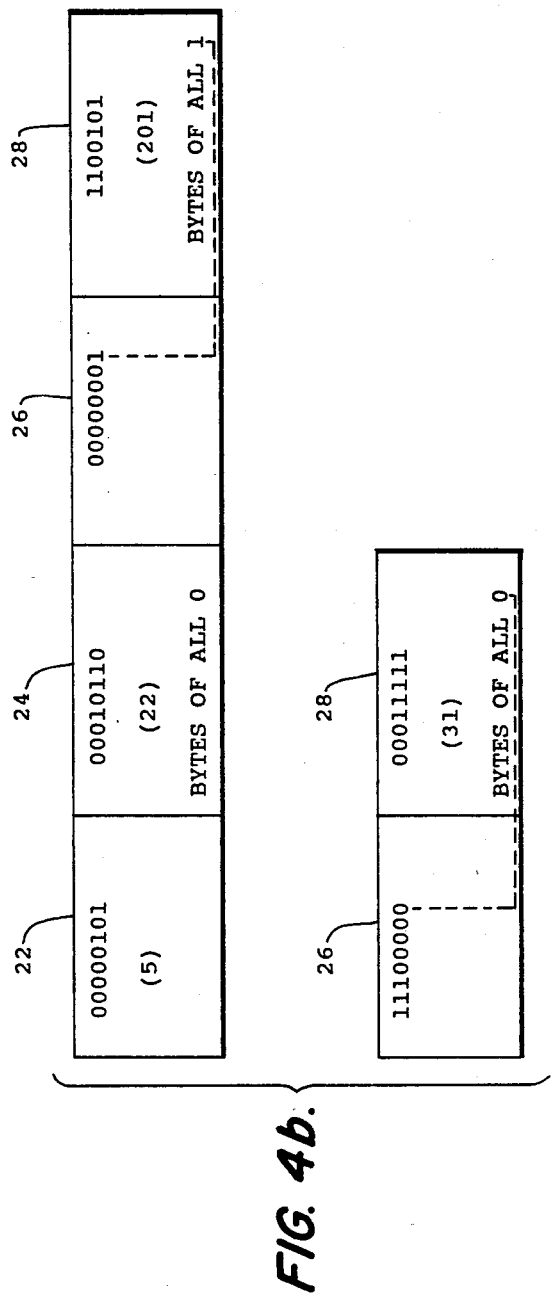
FIG. 4b illustrates the encoding process of the invention for another portion of the lines of FIG. 2.

FIG. 4b illustrates the encoding of lines with vertical addresses of 203–207 which corresponds to the segment as illustrated in FIG. 2. Field 22 is encoded with the number 5 to encode the number of identical horizontal lines 5 as illustrated in FIG. 2. Field 24 is encoded with the number 22 to encode 22 bytes of all zeros which defines the portion of the line of scanning extending between points 0 and points 176 as described above with reference to FIG. 4a. Field 26 is equal to one to encode the last bit position as being equal to one which marks point 183. Field 28 encodes a total of 201 bytes of all ones which extends from point 184 to point 1794. The next inclusion of field 26 is encoded with 24 which is the actual bit pattern of the next byte of image points. The next inclusion of field 28 is encoded with 31 to cover the 31 bytes of all zeros extending between points 1800 and 2047.

The foregoing examples illustrate how the invention is used to encode a group of lines of scanning which individually have a small number of repeating parts with each part typically having a plurality of points encoded with a run of bits of the same value. It should be clearly understood that the invention is not limited to any particular width of field and further that the particular groups of bits which are encoded is not limited to eight as in the preferred example. For example, the groups of bits could be encoded in groups of 16.

Figure 5:
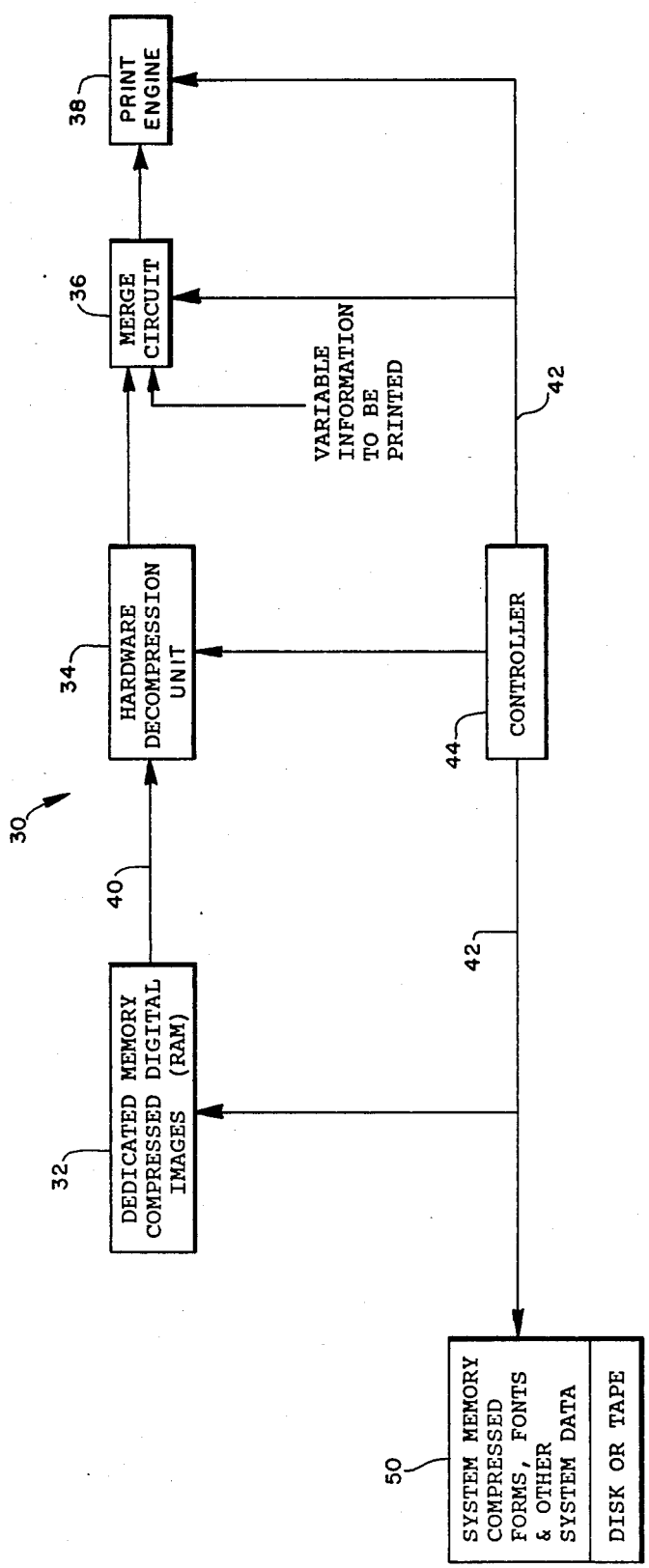
FIG. 5 illustrates a block diagram of a printing system in which the present invention is used.
Figure 6A:
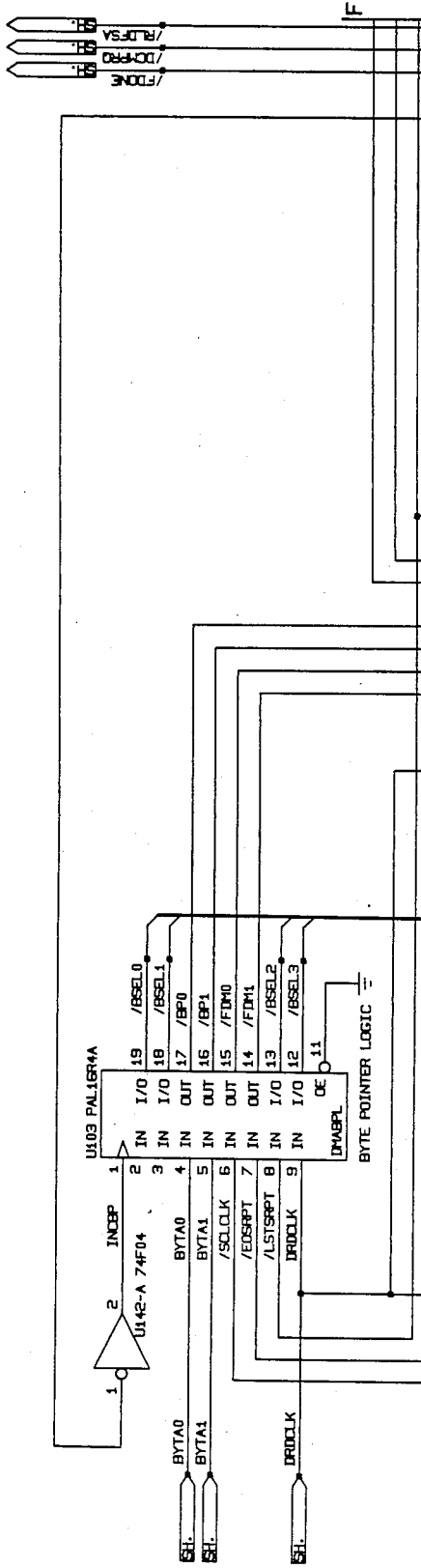
Figure 6A:
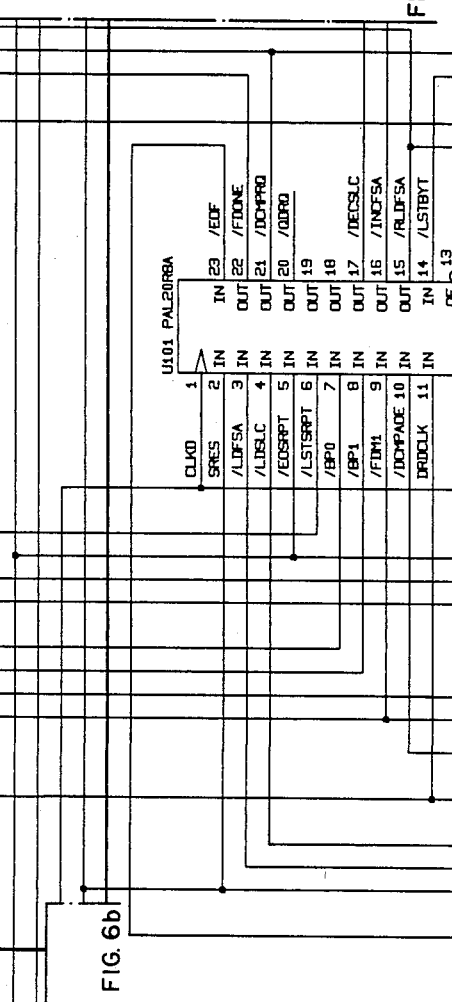
Figure 6A:
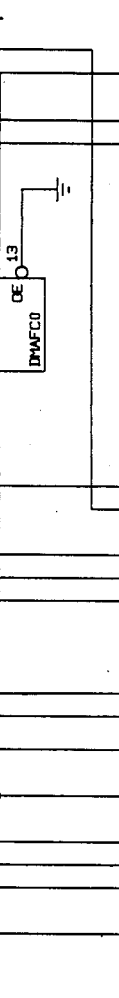
Figure 6B:
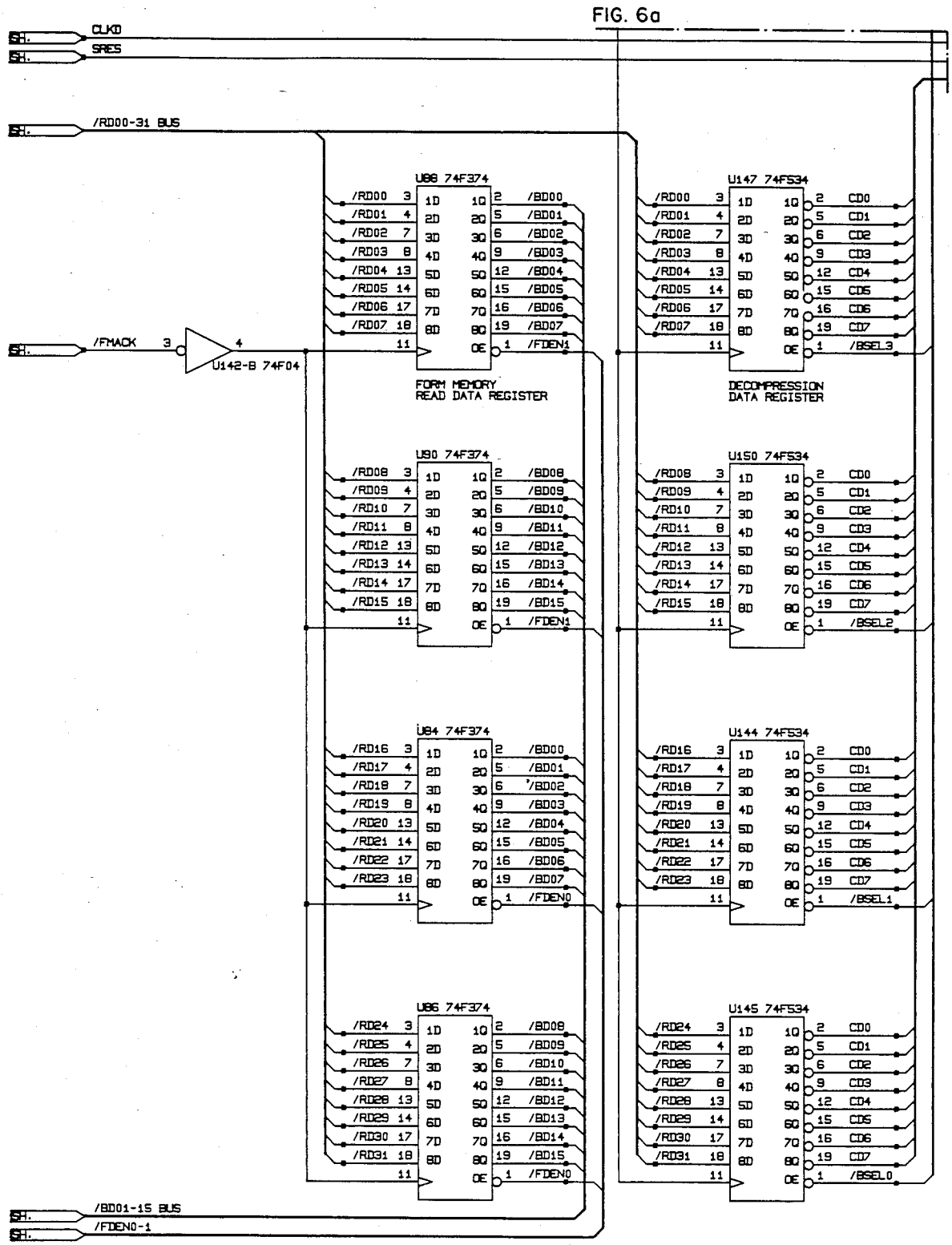
Figure 6C:
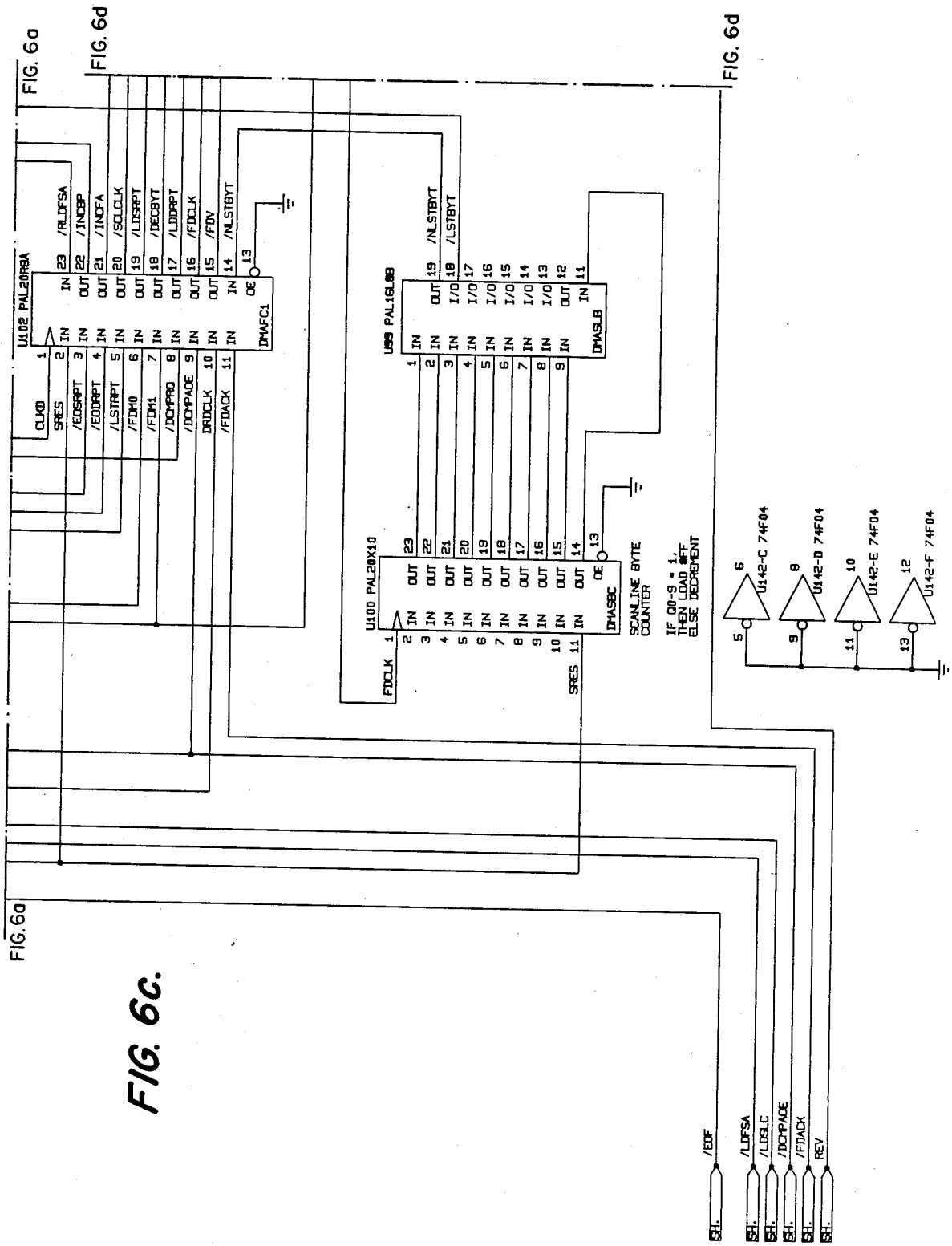

FIG. 5 illustrates a system using the present invention in a high speed printer for printing information such as business forms containing variable textual information. The system 30 has a plurality of forms stored in system memory 50, such as a disk or other storage unit, which may be called to permit the selection of any one of the repertoire of forms stored on the disk. The forms may have any particular format in which each horizontal line is broken down into 2,048 points of information which may be printed selectively by the print matrix of a print engine. The length of each form may be anywhere from one to a total of n lines long which may span one or more sheets of paper. Once a particular form has been requested by a keyboard input or other suitable command, it is transferred in the encoded format described above with a small number of disk cycles over a bus 42, which is distinct from the system bus 40, to prevent dedicated memory 32 from being tied up with comaunications involving the transmitting of digitally coded images between memory 32 and a hardware decompression unit 34 which performs the inverse process to the encoding process described above and then outputs data to the merging circuit 36. The system controller 44 is programmed to control the general operation of the systems in a manner similar to the VISION system. The preferred form of the hardware decompression unit is illustrated in FIGS. 6a–d and 7a–c which are discussed below. The hardware decompression unit 34 operates to expand the encoded form which has been read from the memory 32 into a complete digital image in which each point is individually outputted in groups of 8 points. The output of the hardware decompression unit 34 is applied to a merge circuit 36 which performs essentially as an OR gate at which the digital value of the individual points which have been produced by the hardware decompression unit 34 are merged with variable information such as textual information to be printed to produce an output which is applied to a print engine 38 which is of the type described in U.S. Pat. Nos. 4,155,093, 4,160,257, 4,267,556, 4,365,549 and 4,379,969. The variable information to be printed may be alphanumeric textual information inputted from any source such as a memory or a communication line coupled to a host computer which is to be printed on the form called from memory. It should be clearly understood, however, that the form called from the memory 32 is not limited to the format of a business form and that the variable information to be printed, which is inputted to the merge circuit 36, is not limited to alphanumeric information.

Figure 7A:
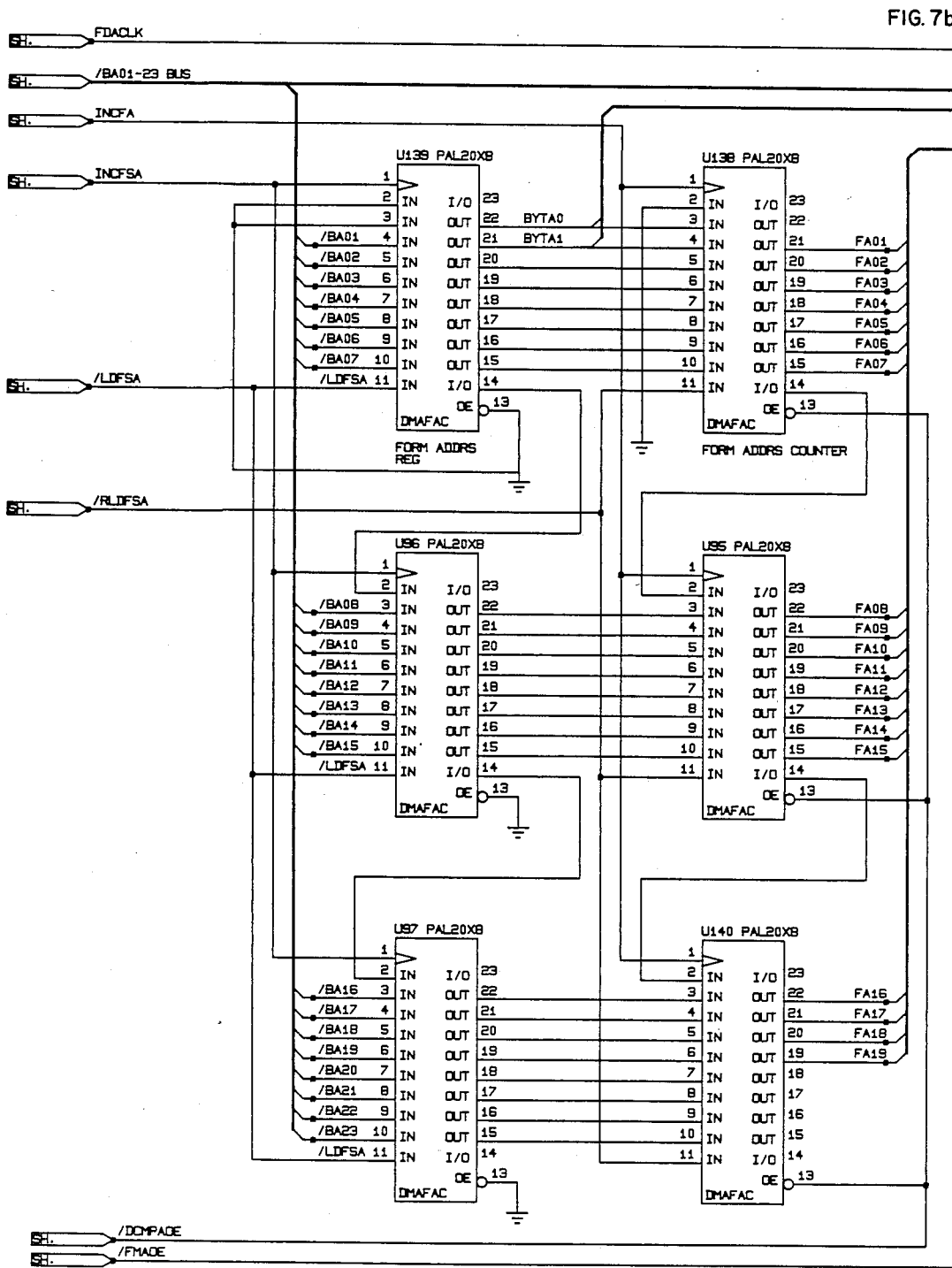
FIGS. 7a-c illustrate a circuit diagram of a controller of an address generator which is part of a decompression unit to be used in decompressing a stored compressed digital image encoded with the present invention.
Figure 7B:
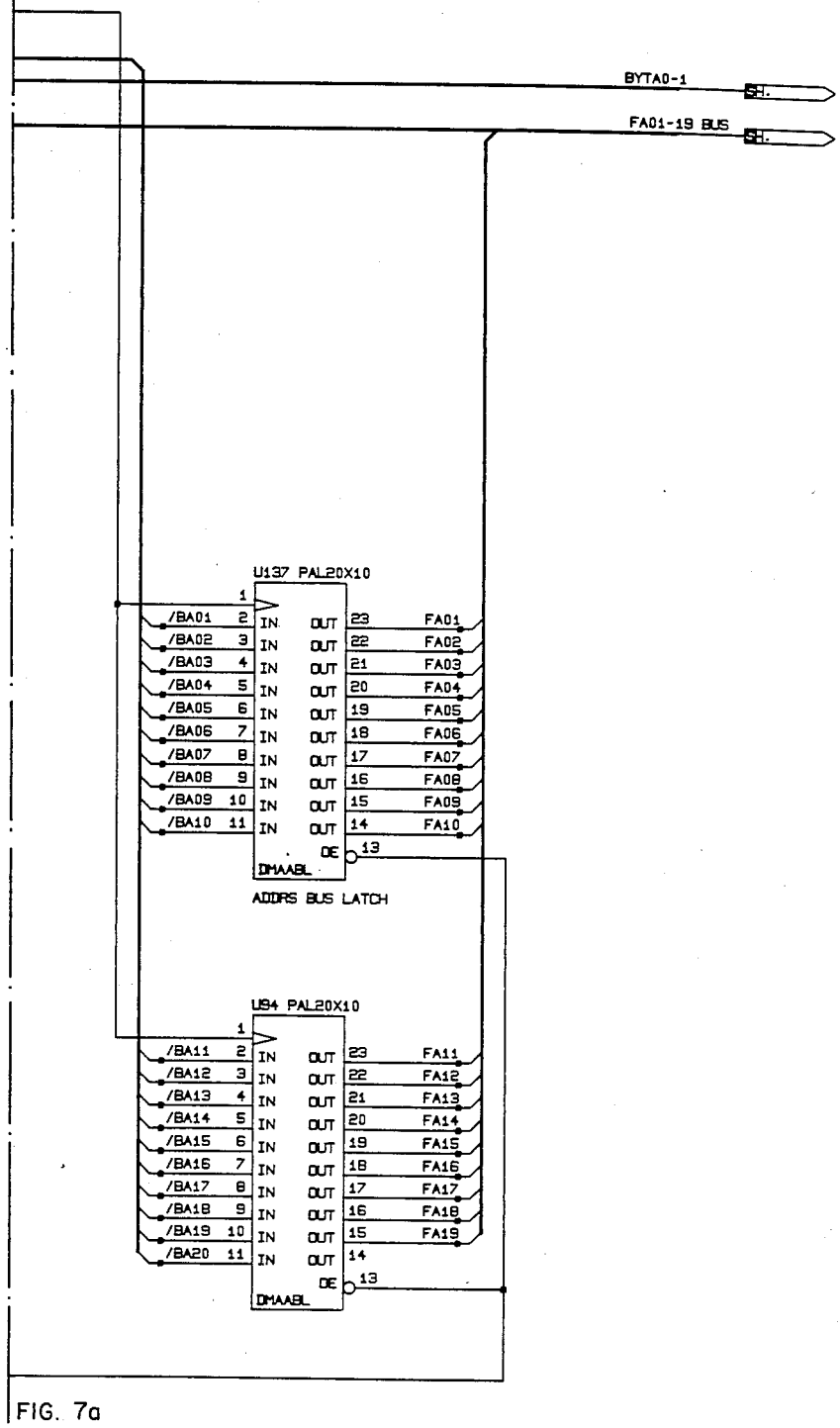
Figure 7C:
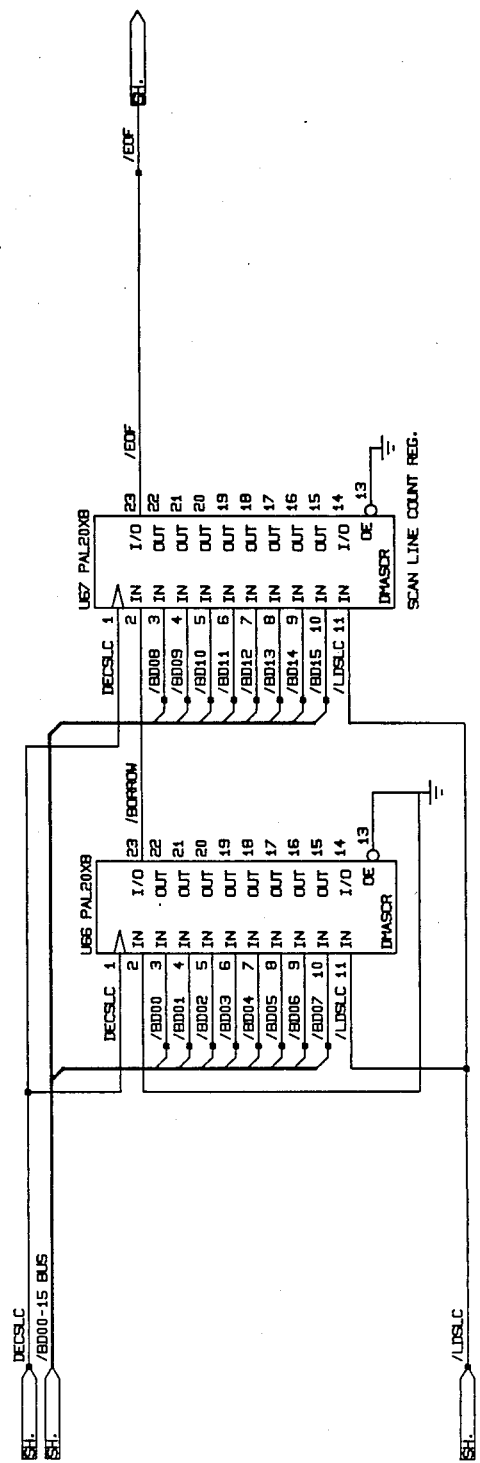

The hardware decompression unit 34 operates as follows with reference to FIGS. 5, 6 and 7. Numbers preceded by a "U" refer to FIGS. 6 and 7 while the remaining numerical references are to FIG. 5. The hardware decompression unit contains a byte counter (U99 and U100 of FIG. 6c) which stores the number of bytes on a line which, in the example given above, is equal to 256. The hardware decompression unit 34 has a line counter (U66 and U67 of FIG. 7c) which stores the total number of lines contained in the document to be printed which, as described above, may vary from one to n with n being any number up to 65,535. The hardware decompression unit 34 also contains an address register (U139, U96 and U97 of FIG. 7a) which stores the starting address of the compressed data stored in the memory 32. In addition an address counter made up of U138, U95 and U140 of FIG. 7a is provided to point to the next data to be retrieved from the memory unit 32. Data is read from the memory unit 32 four bytes at a time and loaded into a decompression data register U147, U150, U144, U145 of FIG. 6b. U103 of FIG. 6a contains the logic that controls which of the four bytes in the decompression data register is active at any time in the decompression process. The overall process is controlled by a state machine made up of U101 and U102 of FIGS. 6a and 6c. After initialization of the byte counter, line counter and address register, the first step is the reading of the first byte and loading of the line repeat counter (U149 of FIG. 6d). Thereafter, the next data byte is read into a data repeat counter (U148 of FIG. 6d). The form data controller U146 of FIG. 6d sends a byte of all zeros to the merging circuit of variable data if field 24 is encoded with a number of one or more. If field 24 was encoded with a zero, then nothing is sent to the merging circuit 36. In the case when a byte of all zeros was sent to the merging circuit 36, the byte counter and the data repeat counter is decremented by one. The successive bytes of all zeros are continually sent to the merging circuit 36 to complete the printing of the segment of the line which contains all zeros with the byte counter and data repeat counter being decremented as each byte is processed. Thereafter, the next byte is fetched from the decompression data register which is the contents of field 26. This information is sent to the merging circuit 36 and the byte counter is decremented. The form data controller causes the reading of the last bit in field 26 and stores its value. The number of bytes encoded in field 28 is loaded into the data repeat counter. The same sequence is described above in the processing of the contents of field 24 is repeated with regard to field 28. The process is continued across the line of scanning involving the fields 26–28 until each of the points with addresses between 0–2,047 has been processed in the line of scanning in the preferred embodiment. Thereafter the line counter and the line repeat counter is decremented by one. The process is repeated until each of the lines stored in the line repeat counter has been processed. Thereafter, the next group of fields in the next sequence of lines such as that illustrated in FIG. 4b are processed until the document is completed. With the preferred embodiment an entire line of a document will be encoded with three or more fields such as those described with reference to FIGS. 4a and 4b.

FIGS. 6a–d and 7a–c illustrate the preferred form of the hardware decompression unit 34. Standard parts are identified by their standard industry wide part identification numbers. The blocks illustrated in FIGS. 6a–d and 7a–c which have not been discussed above are required only to interface the memory unit 32 to the remainder of the system and do not pertain directly to the decompression system.

Reproduced below is a source code listing of the preferred form of processing routine for encoding a bit mapped digitized image which is stored in RAM of the system controller. A limited license is granted to anyone who requires a copy of the program disclosed therein for purposes of understanding or analyzing the present invention, but no license is granted to make a copy for any other purpose, including the loading of a processing device with code in any form or language.

---

COMPRESS - THIS ROUTINE IS USED TO COMPRESS A BITMAP PAGE OF DATA
INTO THE FOLLOWING PATTERN OF BYTE DATA:
1   [line repeat count]
2   [number of bytes of zeroes]
3   [transition byte]
4   [number of bytes of zeroes (if least significant bit of
    transition byte is zero) or number of bytes of ones (if
    least significant bit of transion byte is a one)]
Repeat of items #3 and #4 above until total bit count is equal
    to the number of bits in a scanline of bitmap data.
Repeat the entire sequence until all lines of the bitmap are
    defined.
Copyright 1985 by ANSER TECHNOLOGY.

---

INPUT:  D1 - PAGE NUMBER OF PAGE TO COMPRESS
        A1 - PLACE TO PUT OUTPUT DATA

JACK V FARR 9/6/85

```
CPT     BRS                     SHORT BRANCH OPTION
SECT    0                       LOCATE IN ROM
XDEF    COMPRES,DECMPRS
XREF    1,TMPBUFF
XREF.L  5,PAGETABLE
XREF.L  X,PSTART
XREF.L  X,PLMAX
```

WORKING REGISTERS:

-continued

| D0 | D1 | D2 | D3 | D4 | D5 | D6 | D7 |
|---|---|---|---|---|---|---|---|
| DATA | LINE BYTE CNT | BYTE COUNT | ZERO CONST | | | 255 CONST | LINE COUNT |
| A0 | A1 | A2 | A3 | A4 | A5 | A6 | A7 |
| REPEAT LN ADDRESS | OUTPUT BUFFER | BUFFER PTR | REPEAT LINE | CURRENT LINE | SCRATCH REG | SCRATCH REG | STACK PTR |

```
0:000000 48E7FFF8           COMPRES  MOVEM.L  D0-D7/A0-A6,-(A7)   SAVE REGISTERS USED ON STACK
0:000004 47F900000000x               LEA      PAGETABLE,A3        BASE ADDRESS OF PAGE TABLE POINTERS
0:00000A E549                        LSL      #2,D1               PAGE TIMES 4 = OFFSET
0:00000C 26731000                    MOVE.L   (A3,01),A3          LOGPAGX ADDRESS
0:000010 3E2B0000x                   MOVE     PLMAX(A3),D7        NUMBER OF LINES IN PAGE
0:000014 6746                        BEQ      CMPRERR             IF ZERO, THEN ERROR
0:000016 202B0000x                   MOVE.L   PSTART(A3),00       GET START ADDRESS OF PAGE
0:00001A 6740                        BEQ      CMPRERR             IF PAGE NOT INITIALIZED, THEN ERROR
0:00001C C18B                        EXG      D0,A3               PUT START ADDRESS OF PAGE IN A3
0:00001E 284B                        MOVE.L   A3,A4               A3=REPEAT LINE ADDRS, A4=CURR LINE ADDRS
0:000020 2449                        MOVE.L   A1,A2               A1=OUTPUT BUFFER ADDRS, A2=POINTER
0:000022 34C7                        MOVE     D7,(A2)+            FIRST WORD OF COMPRESSION = # OF LINES
                              * SET UP CONSTANTS NEEDED FOR CMPRSLN ROUTINE
0:000024 7800                        MOVEQ    #0,D4               CONSTANT IN D4
0:000026 3C3C00FF                    MOVE     #255,D6             CONSTANT IN D6
0:00002A 6136                        BSR      CMPRSLN             COMPRESS THE FIRST SCAN LINE
0:00002C 5547                        SUBQ     #2,D7               DECR FOR FIRST LINE AND LOOP COUNTER
0:00002E 6D22                        BLT      ENDCOMP             IF DONE (ONLY ONE LINE PAGE), EXIT
0:000030 BC10             COMPLP     CMP.B    (A0),D6             IF REPEAT COUNT IS ALREADY AT MAXIMUM,
0:000032 6716                        BBQ      NODUP               THEN DO NOT ATTEMPT TO INCREMENT
0:000034 763F                        MOVEQ    #63,D3              LOOP COUNTER FOR # LONG WORDS IN LINE
0:000036 2A4B                        MOVE.L   A3,A5               GET REPEAT LINE START ADDRESS
0:000038 2C4C                        MOVE.L   A4,A6               GET CURRENT LINE START ADDRESS
0:00003A BD8D             CMPARLN    CMPM.L   (A5)+,(A6)+         COMPARE LINE DATA
0:00003C 56CBFFFC                    DBNE     D3,CMPARLN          ELSE LOOP TILL COMPLETE LENGTH COMPARED
0:000040 6608                        BNE      NO DUP              IF LINE DTA NOT EQUAL, DO NOT DUP
0:000042 5210                        ADDDQ.B  #1,(A0)             INCREMENT REPEAT CONTER BY ONE
0:000044 D8FC0100                    ADDI     3256,A4             INCREMENT TO NEXT SCAN LINE
0:000048 6004                        BRA      ENDLOOP             ANDLOOP
0:00004A 264C             NODUP      MOVEA.L  A4,A3               REPEAT LINE = CURRENT LINE
0:00004C 6114                        BSR      CMPRSLN             ROUTINE TO COMPRESS A LINE OF THE PAGE
0:00004E 51CFFFE0         ENDLOOP    DBRA     D7,COMPLP           LOOP TILL ALL LINES COMPRESSED
                          *?????     CALCULATE THE BYTE COUNT (LENGTH) OF COMPRESSED PAGE
0:000052 023000FD         ENDCOMP    ANDI.B   #$FD,CCR            CLEAR THE OVERFLOW FLAG
0:000056 4CDF7FFF         EXITCMP    MOVEM.L  (A7)+,D0-D7/A--A6   RESTORE REGISTERS FROM STACK
0:00005A 4E75                        RTS                          AND RETURN
0:00005C 003C0002         CMPRERR    ORI.B    #$02,CCR            SET THE OVERFLOW FLAG
0:000060 60F4                        ERA      EXITCMP             AND RETURN
```

* CMPRSLN - ROUTINE TO COMPRESS A SCAN LINE OF A PAGE
                                                                        JACK V FARR 9/6/85

```
0:000062 204A             CMPRSLN    MOVE.L   A2,A0               SAVE FIRST ADDRS (THE REPEAT COUNT)
0:000064 14C4                        MOVE.B   D4,(A2)+            INITIALIZE REPEAT COUNT
0:000066 3206                        MOVE     D6,D1               INIT SCAN LINE BYTE LOOP COUNTER
0:000068 7600             COUNT0     MOVEQ    #0,D3               INIT ZERO BYTES COUNTER
0:00006A 101C             RD0DATA    MOVE.B   (A4)+,D0            READ A BYTE OF THE FORM
0:00006C 6608                        BNE      TOTXO               IF NOT ZEROES, THIS IS TRANSITION BYTE
0:00006E 5243             GOTO       ADDQ     #1,D3               INCREMENT ZERO BYTES COUNTER
0:000070 51C9FFF8                    DBRA     D1,RD0DATA          AND GET THE NEXT BYTE
0:000074 6028                        BRA      STRONTO             IF EOL, STORE BYTE COUNT, EXIT
0:000076 14C3             GOTX0      MOVE.B   D3,(A2)+            STORE ZERO BYTES COUNT
0:000078 14C0                        MOVE.B   D0,(A2)+            STORE TRANSITION BYTE
0:00007A 51C90004                    DBRA     D1,CHK0BIT          AND CHECK LAST BIT IN TRANSITION BYTE
0:00007E 4E75                        RTS                          IF EOL, THEN EXIT
0:000080 0900             CHK0BIT    BTST     D4,D0               IF LAST BIT IS A 0,
0:000082 67E4                        BBQ      COUNT0              THEN COUNT THE ZERO BYTES FOLLOWING
0:000084 7600             COUNT1     MOVEQ    #0,D3               ELSE INIT ONES BYTE COUNT
0:000086 101C             RD1DATA    MOVE.B   (A4)+,D0            READ A BYTE OF THE FORM
0:000088 B006                        CMP.B    D6,D0               IF NOT ALL ONES ($FF),
0:00008A 6608                        BNE      GOTX1               THEN THIS IS A TRANSITION BYTE
0:00008C 5243             GOT1       ADDQ     #1,D3               INCREMENT ONE BYTES COUNTER
0:00008E 51C9FFF6                    DBRA     D1,RD1DATA          AND GET THE NEXT BYTE
0:000092 601E                        BRA-     STRCNT1             IF EOL, STORE BYTE COUNT, EXIT
0:000094 14C3             GOTX1      MOVE.B   D3,(A2)+            STORE ONE BYTES COUNT
0:000096 14C0                        MOVE.B   D0,(A2)+            STORE THE TRANSITION BYTE
0:00009C 51C90004                    DBRA     D1,CHK1BIT          AND CHECK LAST BIT IN TRANSITION BYTE
0:000090 4E75                        RTS                          IF EOL, THEN EXIT
0:00009E 0900             CHK1BIT    BTST     D4,D0               IF LAST BIT IN TRANSITION BYTE IS 0,
0:0000A0 67C6                        BEQ      COUNT0              THEN COUNT ZERO BYTES
0:0000A2 60E0                        BRA      COUNT1              ELSE COUNT ONE BYTES
0:0000A4 B646             STRONTO    CMP      D6,D3               IF ZERO BYTES COUNT > 255,
0:0000A6 6E04                        BGT      GT2550              THEN SPLIT INTO COUNT AND TRANS BYTE
0:0000A8 14C3                        MOVE.B   D3,(A2)+            ELSE COUNT FITS IN 8 BITS, SC WRITE IT
0:0000AA 4E75                        RTS                          AND RETURN
```

-continued

| | | | | |
|---|---|---|---|---|
| 0:0000AC 14C6 | GT2550 | MOVE.B | D6,(A2)+ | STORE A 255 ($FF) ZERO BYTES COUNT |
| 0:0000AE 14C4 | | MOVE.B | D4,(A2)+ | STORE A 0 TRANSITION BYTE |
| 0:0000B0 4E75 | | RTS | | AND RETURN |
| 0:0000B2 14C3 | STRONT1 | MOVE.B | D3,(A2)+ | STORE ONE BYTES COUNT (ALWAYS <= 255) |
| 0:0000B4 4E75 | | RTS | | AND RETURN |
| | | PAGE | | |

DECMPRS - ROUTINE TO CONVERT FROM COMPRESSED FORMAT BACK TO BITMAP.
  INPUT:  A1 - START ADDRESS OF COMPRESSED PAGE
          A2 - START ADDRESS OF PLACE TO PUT DECOMPRESSED DATA
  OUTPUT: DATA IS OUTPUT TO MEMORY STARTING AT ADDRESS A2
          CCR - OVERFLOW FLAG IS SET IF ILLEGAL SCAN LINE COUNT
  WORKING REGISTERS:

| D0 | D1 | D2 | D3 | D4 | D5 | D6 | D7 |
|---|---|---|---|---|---|---|---|
| SCRATCH REG | LINE BYTE CT | ZERO CONST | $100 (256) | SCRATCH REG | LINE RPT CT | SCAN LN COUNT | $00,$FF |

| A0 | A1 | A2 | A3 | A4 | A5 | A6 | A7 |
|---|---|---|---|---|---|---|---|
| | DECMPRESS PTR | OUTPUT PTR | TMPBUFF ADDRS | TMPBUFF INDEX | | | STACK PTR |

JACK V FARR 9/6/85

| | | | | |
|---|---|---|---|---|
| 0:000086 48E7FF78 | DECMPRS | MOVEM.L | D0-D7/A1-A4,-(A7) | SAVE REGISTERS USED ON STACK |
| 0:0000BA 47F80000x | | LEA | TMPBUFF,A3 | LOAD CONSTANT OF TMPBUFF ADDRESS |
| 0:0000BE 7400 | | MOVEQ | #0,D2 | ZEROES CONSTANT |
| 0:0000C0 363C0100 | | MOVE | #256,D3 | 256 CONSTANT |
| 0:0000C4 3C19 | | MOVE | (A1)+,D6 | GET NUMBER OF LINES IN THIS COMPRESSION |
| 0:0000C6 6F46 | | BLE | DCMPERR | IF <= 0, THEN ERROR |
| 0:0000C8 284B | LINSTRT | MOVEA.L | A3,A4 | LOAD TMPBUFF ADDRESS IN A4 |
| 0:0000CA 7A00 | | MOVEQ | #0,D5 | CLEAR D5 TO ACCEPT DATA |
| 0:0000CC 1A19 | | MOVE.B | (A1)+,D5 | LINE REPEAT COUNT |
| 0:0000CE 3203 | | MOVE | D3,D1 | D1 = 256 |
| 0:0000D0 7E00 | INIT0 | MOVEQ | #0,D7 | CLEAR D7 TO MOVE ZERO BYTES |
| 0:0000D2 7000 | READBYT | MOVEQ | #0,D0 | CLEAR D0 TO ACCEPT DATA |
| 0:0000D4 1019 | | MOVE.B | (A1)+,D0 | GET THE BYTE REPEAT COUNT |
| 0:0000D6 3800 | | MOVE | D0,D4 | STORE FOR USE AS LOOP COUNTER |
| 0:0000D8 6002 | | BRA | ENDBYLP | AND MOVE THAT MANY BYTES |
| 0:0000DA 18C7 | BYTLOOP | MOVE.B | D7,(A4)+ | MOVE BYTES |
| 0:0000DC 51CCFFFC | ENDBYLP | DBRA | D4,BYTLOOP | UNTIL ALL BYTES MOVED |
| 0:0000E0 9240 | | SUB | D0,D1 | SUBTRACT NUMBER OF BYTES MOVED |
| 0:0000E2 6F0E | | BLE | MOVLINE | IF EOL, MOVE THE LINE |
| 0:0000E4 1899 | | MOVE.B | (A1)+,(A4) | STORE THE TRANSITION BYTE |
| 0:0000E6 5341 | | SUBQ | #1,D1 | DECR COUNT FOR TRANSITION BYTE MOVED |
| 0:0000E8 6F08 | | BLE | MOVLINE | IF EOL, MOVE THE LINE |
| 0:0000EA 051C | | BTST | D2,(A4)+ | IF THE LAST BIT IN TRANSITION IS 0, |
| 0:0000EC 67E2 | | BEQ | INIT0 | THEN MOVE MORE ZERO BYTES |
| 0:0000EE 7EFF | | MOVEQ | #$FF,D7 | ELSE SET PARM TO MOVE ALL ONES |
| 0:0000F0 60E0 | | BRA | READBYT | AND MOVE BYTES OF ONES |
| 0:0000F2 3805 | MOVLINE | MOVE | D5,D4 | SAVE LINE REPEAT COUNT |
| 0:0000F4 284B | MOVIT | MOVE.L | A3,A4 | GET START ADDRESS OF TMPBUFF IN A4 |
| 0:0000F6 723F | | MOVEQ | #63,D1 | SET LOOP FOR NO. OF LONG WORDS IN LINE |
| 0:0000F8 24DC | MOVLOOP | MOVE.L | (A4)+,(A2)+ | WRITE WORD FROM TMPBUFF TO MEMORY |
| 0:0000FA 51C9FFFC | | DBRA | D1,MOVLOOP | LOOP TILL ENTIRE LINE MOVED |
| 0:0000FE 51CCFFF4 | | DBRA | D4,MOVIT | LOOP DUPLICATING LINES AS NEEDED |
| 0:000102 5346 | | SUBQ | #1,D6 | DECR FOR LINE JUST MOVED |
| 0:000104 9C45 | | SUB | D5,D6 | DECR NUMBER OF REPEATS JUST MOVED |
| 0:000106 6CC0 | | BGE | LINSTRT | IF MORE LINES TO DECOMPRESS, CONTINUE |
| 0:000108 4CDF1EFF | ENDDCMP | MOVEM.L | (A7)+,D0-D7/A1-A4 | RESTORE REGISTERS FROM STACK |
| 0:000100 4E75 | | RTS | | AND RETURN |
| 0:00010E 003C0002 | DCMPERR | ORI.B | #$02,CCR | SET THE OVERFLOW FLAG FOR ERROR |
| 0:000112 60F4 | | BRA | ENDDCMP | AND RETURN |
| | | END | | |

While the invention has been described in terms of its preferred embodiment, it should be understood that numerous modifications may be made thereto without departing from the spirit and scope of the invention as defined in the appended claims.

I claim:

1. A process for encoding a digitized image comprised of one or more lines with each line of the image having a plurality of sequential digitized points extending from a first point to a last point wherein the individual points are encoded as binary levels of 1 or 0 comprising:

(a) encoding each line of the digitized image with an integer number of fields of bits, comprising a first type encoding a number of sequential groups of points, with each group being encoded with bits of only one pre-designated binary level, extending from a starting point of the line to a group of points immediately preceding a group of points which has one or more points encoded with bits of the other binary level or to a group of points which is one more than the maximum number of groups which can be defined with the first type of field, a second type containing the actual bits of the group of image points which follow the image points encoded by the preceding field; and a third type encoding a number of sequential groups of points encoded with bits which contain only the level of the last bit in the second field type which immediately follow the last bit of the image points encoded by the second field type; and (b) encoding any remainder of the line not encoded by the first, second and third field types by repeating the encoding process of part (a) using field types two and three, with respect to the remainder of the line until the group of points containing the last point is encoded.

2. A process in accordance with claim 1 further comprising:

encoding the number of lines within the digitized image which have the same identical format by a fourth type of field.

3. A process in accordance with claim 2 wherein each of the groups of bits is eight bits and each of the fields is eight bits.

4. A process in accordance with claim 1 wherein the one predesignated binary level is a 0 which encodes light areas of the image and the other binary level is a 1 which encodes dark areas of the image.

5. A process in accordance with claim 2 wherein the digitized image is a form which is to be printed.

6. A process in accordance with claim 5 wherein:
    (a) the encoded digitized image of a form is stored in a memory wherein a plurality of encoded digitized images of different forms may be stored;
    (b) the encoded digitized image of a desired form to be used in printing is recalled from the memory when the form is to be printed; and
    (c) the recalled encoded digitized image is converted to a digitized image and the digitized image is used to drive a matrix of printing elements to print the form.

7. A process in accordance with claim 6 wherein additional information to be printed is also used to drive the matrix of printing elements.

8. A data compaction process comprising:
    (a) providing a digitized image comprising one or more lines with each line of the image having a plurality of sequential digitized points extending from a first point to a last point wherein the individual points are encoded as binary levels of 1 or 0; and
    (b) encoding each line of the digitized image with an integer number of fields of bits, the fields of bits comprising a first type encoding the number of sequential groups of points, with each group being encoded with bits of only one pre-designated binary level, extending from a starting point of the line to a group of points immediately preceding a group of points which has one or more points encoded with bits of the other binary level or to a group of points which is one more than the maximum number of groups which can be defined with the first type of field, a second type containing the actual bits of the group of image points which follow the image points encoded by the preceding field; and a third type encoding a number of sequential groups of points encoded with bits which contain only the level of the last bit in the second field type which immediately follow the last bit of the image points encoded by the second field type.

9. A process in accordance with claim 8 further comprising:

encoding the number of consecutive lines within the digitized image which have the same identical format by a fourth field type.

* * * * *